United States Patent
Tiirola et al.

(10) Patent No.: US 8,144,570 B2
(45) Date of Patent: Mar. 27, 2012

(54) APPARATUS, METHOD AND COMPUTER PROGRAM PRODUCT PROVIDING MULTIPLEXING FOR DATA-NON-ASSOCIATED CONTROL CHANNEL

(75) Inventors: Esa Tiirola, Kempele (FI); Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 1159 days.

(21) Appl. No.: 11/904,518

(22) Filed: Sep. 26, 2007

(65) Prior Publication Data

US 2008/0075060 A1 Mar. 27, 2008

Related U.S. Application Data

(60) Provisional application No. 60/847,414, filed on Sep. 26, 2006.

(51) Int. Cl.
*H04J 11/00* (2006.01)

(52) U.S. Cl. .................... 370/203; 370/210; 370/328

(58) Field of Classification Search .................. None
See application file for complete search history.

(56) References Cited

U.S. PATENT DOCUMENTS

| | | | | |
|---|---|---|---|---|
| 5,926,500 | A | 7/1999 | Odenwalder | 375/200 |
| 7,355,960 | B2 * | 4/2008 | Kang et al. | 370/208 |
| 7,411,894 | B2 * | 8/2008 | Ro et al. | 370/203 |
| 7,457,230 | B2 * | 11/2008 | Ohkubo et al. | 370/208 |
| 7,701,919 | B2 * | 4/2010 | Ah Lee | 370/344 |
| 2003/0006796 | A1 | 1/2003 | Stark | 375/130 |
| 2004/0066802 | A1 * | 4/2004 | Ro et al. | 370/528 |
| 2005/0111492 | A1 * | 5/2005 | Kang et al. | 370/480 |
| 2006/0050799 | A1 | 3/2006 | Hou et al. | 375/260 |
| 2006/0215603 | A1 | 9/2006 | Nishio et al. | 370/329 |
| 2006/0245472 | A1 * | 11/2006 | Pan et al. | 375/144 |
| 2006/0274842 | A1 * | 12/2006 | Pan et al. | 375/260 |
| 2006/0291431 | A1 | 12/2006 | Pajukoski et al. | 370/335 |
| 2007/0004465 | A1 | 1/2007 | Papasakellariou et al. | 455/571 |
| 2007/0058595 | A1 * | 3/2007 | Classon et al. | 370/337 |
| 2007/0171995 | A1 | 7/2007 | Muharemovic et al. | 375/260 |
| 2007/0183386 | A1 | 8/2007 | Muharemovic et al. | 370/344 |
| 2007/0195906 | A1 | 8/2007 | Kim et al. | 375/267 |
| 2007/0263529 | A1 * | 11/2007 | Ishikura et al. | 370/211 |
| 2008/0049708 | A1 | 2/2008 | Khan et al. | 370/343 |
| 2008/0123616 | A1 * | 5/2008 | Lee | 370/344 |
| 2009/0149187 | A1 * | 6/2009 | Miki et al. | 455/450 |

(Continued)

FOREIGN PATENT DOCUMENTS

WO WO 98/04973 2/1998

(Continued)

OTHER PUBLICATIONS

3GPP TR 25.814 V7.0.0 (Jun. 2006) "Multiplexing of L1/L2 Control Signaling", $3^{rd}$ Generation Partnership Project; Technical Specification Group Radio Access Network; Physical layer aspects for evolved Universal Terrestrial Radio Access (UTRA) Release 7, p. 74.

(Continued)

*Primary Examiner* — Bob Phunkulh
(74) *Attorney, Agent, or Firm* — Harrington & Smith (57) ABSTRACT

A method is provided for block spreading individual control symbol sequences, mapping the block spread control symbol sequences, adding a cyclic prefix to the block spread control symbol sequences to form a data-non-associated control signaling information, and transmitting the data-non-associated control signaling information.

22 Claims, 8 Drawing Sheets

U.S. PATENT DOCUMENTS

| | | | | |
|---|---|---|---|---|
| 2009/0227261 | A1 | 9/2009 | Tiirola et al. | 455/450 |
| 2009/0279527 | A1* | 11/2009 | Fukuoka et al. | 370/342 |

FOREIGN PATENT DOCUMENTS

| | | |
|---|---|---|
| WO | WO 02/33911 A1 | 4/2002 |
| WO | WO-2007/084840 A2 | 7/2007 |
| WO | WO-2007/149290 A2 | 12/2007 |
| WO | WO-2008/035955 A2 | 3/2008 |

OTHER PUBLICATIONS

NTT DoCoMo, NEC, SHARP: "Orthogonal Pilot Channel in the Same Node B in Evolved UTRA Uplink", 3GPP TSG RAN WG1 #42 on LTE, London, UK, Aug. 29-Sep. 2, 2005, pp. 1-4.

Xiaoming Peng et al, "A Simplified Transceiver Structure for Domain Equalization", Vehicular Technology Conference, 2005, 2005 IEEE $61^{st}$. vol. 3, May 30-Jun. 1, 2005.

Ericsson: "Multiplexing of ACK/NACK and Scheduling Request on PUUCH", TSG-RAN WG1, R1-080510, Sevilla, Spain, Jan. 14-18, 2008, p. 4.

3GPP TS36.211 v1.2.1, "$3^{rd}$ Generation Partnership Project; Technical Specification Group Radio Access Network; Evolved Universal Terrestrial Radio Access (E-UTRA); Physical Channels and Modulation"; (Release 8) Jul. 2007.

TSG-RAN WG1 LTE AdHoc; R1-061862; "Uplink Non-Data-Associated Control Signaling", Ericsson; Cannes, France; Jun. 27-30; 2006.

3GPP TSG Ran1 #46; R1-062065; "L1/L2 Uplink Control Mapping & Numerology", Motorola; Tallinn, Estonia; Aug. 28-Sep. 1, 2006.

3GPP TSG RAN WG1 LTE Ad Hoc; R1-061674; "Single-Carrier Based Multiplexing of Uplink L1/L2 Control Channel", MTT DoCoMo, Fujitsu, NEC, Sharp, Toshiba Corporation; Cannes, France; Jun. 27-30, 2006.

3GPP Tsg Ran WG1 LTE Ad Hoc; R1-061675; "Data-Non-Associated L1/L2 Control Channel Structure for E-UTRA Uplink", NTT-DoCoMo, Sharp, Toshiba Corporation; Cannes, France; Jun. 27-30, 2006.

3GPP RAN1 LTE Ad Hoc; R1-061699; "Uplink ACK/NACK Signaling: FDM vs. TDM", Samsung; Cannes, France; Jun. 27-30, 2006.

3GPP TSG RAN WG1 LTE Ad Hoc; R1-061779; "Multiplexing of Control Signaling in E-UTRA Uplink", LG Electronics; Cannes, France; Jun. 27-30, 2006.

3GPP TSG RAN1 LTE Ad Hoc; R1-061802; "Multiplexing and Link Analysis of CQI Channel in UL", Qualcomm Europe; Cannes, France; Jun. 27-30, 2006.

Guangliang Ren et al.; "Synchronization Method Based on a New Constant Envelop Preamble for OFDM Systems", IEEE Transactions on Broadcasting, vol. 51, No. 1, Mar. 2005; pp. 139-143.

Liru Le et al; "Extended Orthogonal Polyphase Codes for Multicarrier CDMA System", IEEE Communications Letters, vol. 8, No. 12; Dec. 2004; pp. 700-702.

"On Allocation of Uplink Pilot Sub-Channels in EURA SC-FDMA", 3GPP TSG RAN WG I Ad Hoc on LTE, R1-050822, Aug.-Sep. 2005, 7 pgs.

"Cubic Metric properties of CAZAC sequences", 3GPP TSG RAN WG1#45, R1-061284, May 2006, 4 pgs.

"Coherent vs. non-coherent ACK/NAK signaling in E-UTRA uplink", 3GPP TSG RAN WG! Meeting #48, R1-070749, Feb. 2007, 7 pgs.

Chang, Y. et al., "Synchronization Method Based on a New Constant Envelop Preamble for OFSM Systems", IEEE Transactions on Broadcasting, IEEE Service Center, Piscataway, NJ, US, vol. 51, No. 1, Mar. 2005, sections III, and V.

Dubey, V.K. et al., "Extended Orthogonal Polyphase Codes for Multicarrier CDMA System", IEEE Communications Letters, IEEE Service Center, Piscataway, NJ, US, vol. 8, No. 12, Dec. 2004, pp. 700-702, sections I, II, and V.

3GPP TR 25,814, V.7.0.0 (Jun. 2006), $3^{rd}$ Generation Partnership Project; Technical Specification Group Radio Access Network; Physical layer aspects for evolved Universal Terrestrial Radio Access (UTRA) (Release 7), pp. 67-78.

3GPP TSG RAN WG1#44bis, R1-060925: Comparison of Proposed Uplink Pilot Structures for SC-OFDMA, Agenda Item: 10.2.1, Athens, Greece, Mar. 27-31, 2006.

* cited by examiner

| MCS NUMBER | MODULATION/CODING SCHEME | SPEADING FACTOR(SF) | BLOCK REPETITION FACTOR (BRF) | NUMBER OF BITS/1MS TTI | #ORTHOGONAL RESOURCES/1MS TTI | PROCESSING GAIN |
|---|---|---|---|---|---|---|
| 1 | BPSK 1/6 | 4 | 2 | 2.0 | 4 | 9.0dB |
| 2 | BPSK 1/3 | 4 | 2 | 4.0 | 4 | 9.0dB |
| 3 | BPSK 1/2 | 4 | 2 | 6.0 | 4 | 9.0dB |
| 4 | QPSK 1/2 | 4 | 2 | 12.0 | 4 | 9.0dB |
| 5 | QPSK 1/2 | 4 | 1 | 24.0 | 4 | 6.0dB |
| 6 | QPSK 2/3 | 4 | 1 | 32.0 | 4 | 6.0dB |

APPARATUS, METHOD AND COMPUTER PROGRAM PRODUCT PROVIDING MULTIPLEXING FOR DATA-NON-ASSOCIATED CONTROL CHANNEL

CROSS-REFERENCE TO RELATED APPLICATIONS

This patent application claims priority under 35 U.S.C. §119(e) from Provisional Patent Application No. 60/847,414 filed Sep. 26, 2006, the disclosure of which is incorporated by reference herein in its entirety.

TECHNICAL FIELD

The teachings in accordance with the exemplary and non-limiting embodiments of this invention relate generally to wireless communication systems, methods, devices and computer program products and, more specifically, relate to techniques for signaling control information from a user device to a fixed wireless network device, such as by using data-non-associated control channel signaling.

BACKGROUND

Certain abbreviations that may be found in the description and/or in the Figures are herewith defined as follows:
3GPP Third Generation Partnership Project
ACK acknowledgment
AMC adaptive modulation and coding
BPSK binary phase shift keying
BW bandwidth
CAZAC constant-amplitude zero auto-correlation
CDM code division multiplexing
CP cyclic prefix
CQI channel quality indicator
E-UTRAN evolved UTRAN
FBI feedback information
FDM frequency division multiplexing
FDMA frequency division multiple access
FFT fast Fourier transform
HARQ hybrid automatic repeat request
IFFT inverse FFT
L1 Layer 1 (physical layer)
L2 Layer 2 (data link layer)
LB long block
LTE long term evolution
MCS modulation coding scheme
NACK negative ACK
Node-B Base Station
eNB EUTRAN Node B
OFDM Orthogonal Frequency Domain Multiplex
PAPR peak to average power ratio
PRB physical resource block
PUCCH physical uplink control channel
QPSK quadrature phase shift keying
SB short block
SC-FDMA single carrier, frequency division multiple access
SF spreading factor
SINR signal-to-interference and noise ratio
TDM time division multiplexing
TTI transmission time interval
UE user equipment
UL uplink
UTRAN universal terrestrial radio access network
ZAC zero autocorrelation sequence A proposed communication system known as evolved UTRAN (E-UTRAN, also referred to as UTRAN-LTE) is currently under discussion within the 3GPP. The current working assumption is that the DL access technique will be OFDM, and the UL technique will be SC-FDMA.

Control channel multiplexing is performed in the UTRAN-LTE system, including control channel multiplexing in the SC-FDMA based UL. There are two different type of control signals to be carried in the UL:
1. Data associated control signaling including transport format and HARQ information. This information is associated with UL data transmissions.
2. Data-non-associated control signaling, such as CQI and/or ACK/NACK due to downlink transmissions.
Of particular interest to this discussion is the data-non-associated control signaling, the transmission of which may be divided into two separate classes:
a) data-non-associated control signaling multiplexed with UL data; and
b) data-non-associated control transmitted without UL data.
Of further particular interest to this discussion is the data-non-associated control signaling without UL data (class b above).

Reference in this regard may be had to 3GPP TR 25.814, v7.0, Section, 9.1.1.2.3, Multiplexing of L1/L2 control signaling, where it is stated that there are three multiplexing combinations for the uplink pilot, data, and L1/L2 control signaling within a sub-frame that are considered for a single UE:
multiplexing of pilot, data, and data-associated L1/L2 control signaling;
multiplexing of pilot, data, and data-associated and data-non-associated L1/L2 control signaling; and
multiplexing of pilot and data-non-associated L1/L2 control signaling.

In single-carrier FDMA radio access, time-domain multiplexing is used for the above-mentioned three multiplexing combinations in order to retain the advantageous single-carrier feature with a low PAPR.

Both data-associated and data-non-associated control signaling are time-multiplexed with data and pilot within the sub-frame. Furthermore, the data-associated and data-non-associated control signaling from multiple UEs are multiplexed in the frequency or/and code domains associated with multiple pilot channels.

The data-non-associated control signaling can also be time-multiplexed with data if the UE has UL data transmission. Meanwhile, the data-non-associated control signaling for that transmit only the L1/L2 control, is multiplexed exclusively in a semi-statically assigned time-frequency region. This channel is called as PUCCH (Physical Uplink Control Channel) in current LTE terminology. The data-non-associated control signaling of different UEs is multiplexed using the frequency/time/code domain, or a hybrid of them, within the assigned time-frequency region. The exclusive time-frequency region can be separated into multiple separated frequency-time resources. The possibility for multiplexing of data-non-associated control signaling with data channel by exclusive frequency resource, i.e., frequency-multiplexing, is for further study.

Figure 1:
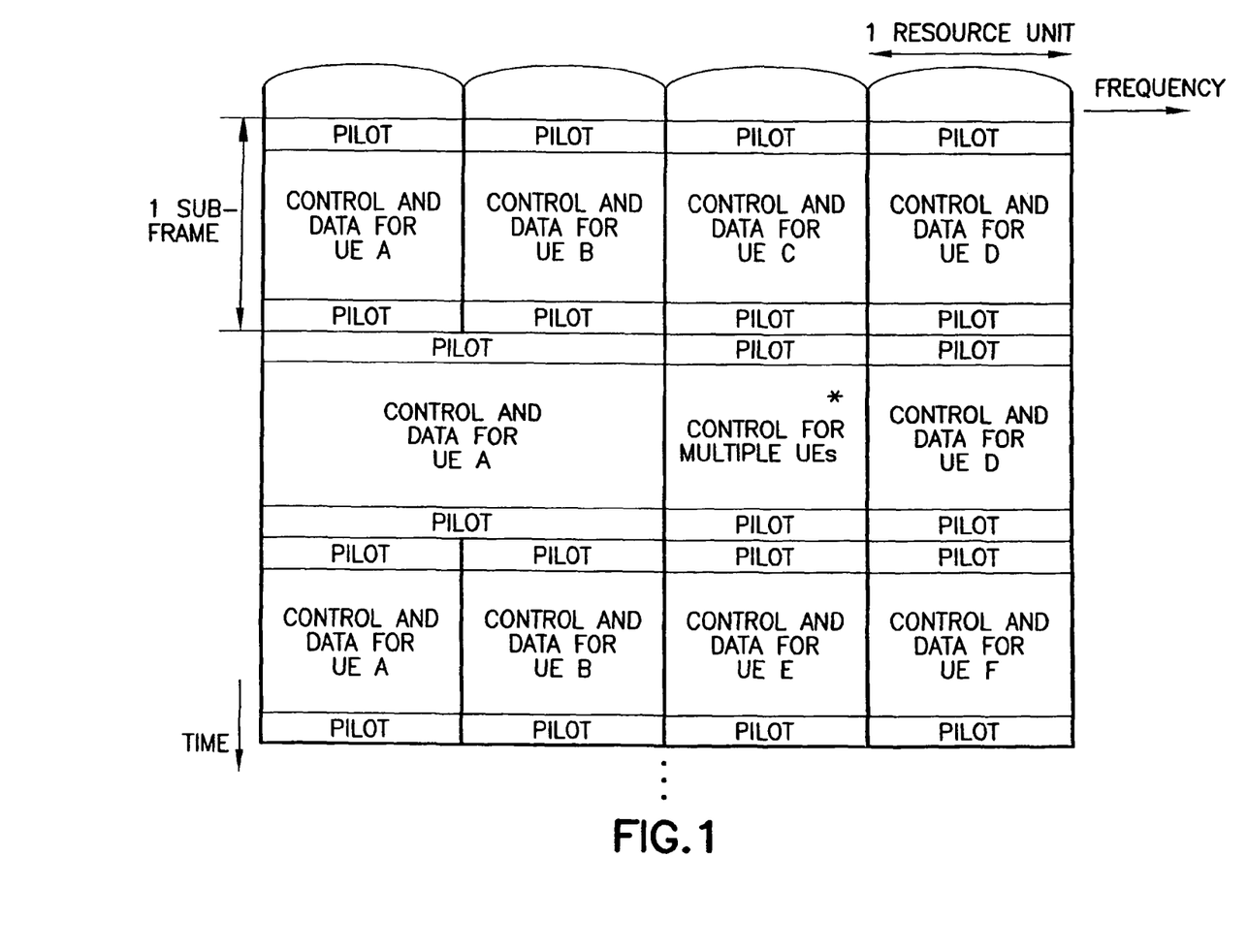
FIG. 1 reproduces a part of Figure 9.1.1.23-2 of 3GPP TR25.814.

FIG. 1 herein reproduces a part of Figure 9.1.1.23-2 of 3GPP TR25.814, "Multiplexing scheme for L1/L2 control signaling, data, and pilot", and assumes that data-non-associated control signaling for UEs that transmits only the L1/L2 control, is multiplexed exclusively in a semi-statically assigned time-frequency region (denoted with the asterisk in FIG. 1). On the contrary, UEs which have both UL data and data-non-associated control signaling utilize time-multiplexing between control and data.

An assumption may be made that the amount of data to be carried in the considered resource varies between 1-30 bits. For example, three different cases may exist: ACK/NACK only; CQI only; and ACK/NACK+CQI. However, L1 feedback (FB), needed by various MIMO and closed loop beamforming techniques, may also be considered.

It has been assumed that dedicated frequency/time resource for shared control channel requires (at least) two PRBs (360 kHz) per 5 MHz BW (overhead=8%). The target has been that at least 12 users/TTI should be orthogonally multiplexed for the given resource (simultaneously).

A problem that arises is how to multiplex a sufficient amount of UEs into the pre-determined resources in such a way that the control information can be conveyed in a reliable fashion on the UL.

Several contributions on data-non-associated channel multiplexing have been proposed thus far during the 3GPP standardization process for UTRAN-LTE.

For example, in R1-061862, "Uplink Non-data-associated Control Signaling": Ericsson, Jun. 27-30, 2006, it is proposed to have a new sub-frame format with an additional short block for data-non-associated control signaling. At least one perceived problem with this proposal, however, is that the scalability of the resource is less than optimum.

Also by example, in R1-062065, "L1/L2 UL Control Mapping and Numerology": Motorola, Aug. 28-Sep. 1, 2006, it is proposed to have a FDM-type of multiplexing combined with frequency hopping within a sub-frame. At least one perceived problem with this proposal is that the number of active subcarriers is only two, which can lead to very high power differences between UEs occupying a large bandwidth. Thus, there is an increased probability that intra-cell orthogonality would be lost at least to some extent under practical transmission conditions, such as those where frequency and timing errors exist.

Section 9.1.1 of 3GPP TR 25.814, v7.0 is incorporated by reference.

SUMMARY

In an exemplary aspect of the invention, there is a method comprising block spreading individual control symbol sequences, mapping the block spread control symbol sequences, adding a cyclic prefix to the block spread control symbol sequences to form a data-non-associated control signaling information, and transmitting the data-non-associated control signaling information.

In another exemplary aspect of the invention, there is an apparatus comprising a block spreading unit configurable to spread individual control symbol sequences, a mapping unit configurable to map the block spread control symbol sequences, and a processor to add a cyclic prefix to the block spread control symbol sequences to form data-non-associated control signaling information, and a transmitter to transmit the data-non-associated control signaling information.

In another exemplary aspect of the invention, there is a computer readable medium encoded with a computer program executable by a processor to perform actions comprising block spreading individual control symbol sequences, mapping the block spread control symbol sequences, adding a cyclic prefix to the block spread control symbol sequences to form data-non-associated control signaling information, and transmitting the data-non-associated control signaling information.

In another exemplary aspect of the invention, there is an integrated circuit comprising a first circuit configurable to block spread individual control symbol sequences, a second circuit configurable to map the block spread control symbol sequences, a third circuit configurable to add a cyclic prefix to the block spread control symbol sequences to form data-non-associated control signaling information, and a fourth circuit configurable to transmit the data-non-associated control signaling information.

In yet another exemplary aspect of the invention, there is an apparatus comprising means for block spreading individual control symbol sequences, means for mapping the block spread control symbol sequences, means for adding a cyclic prefix to the block spread control symbol sequences to form data-non-associated control signaling information, and means for transmitting the data-non-associated control signaling information.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 2:
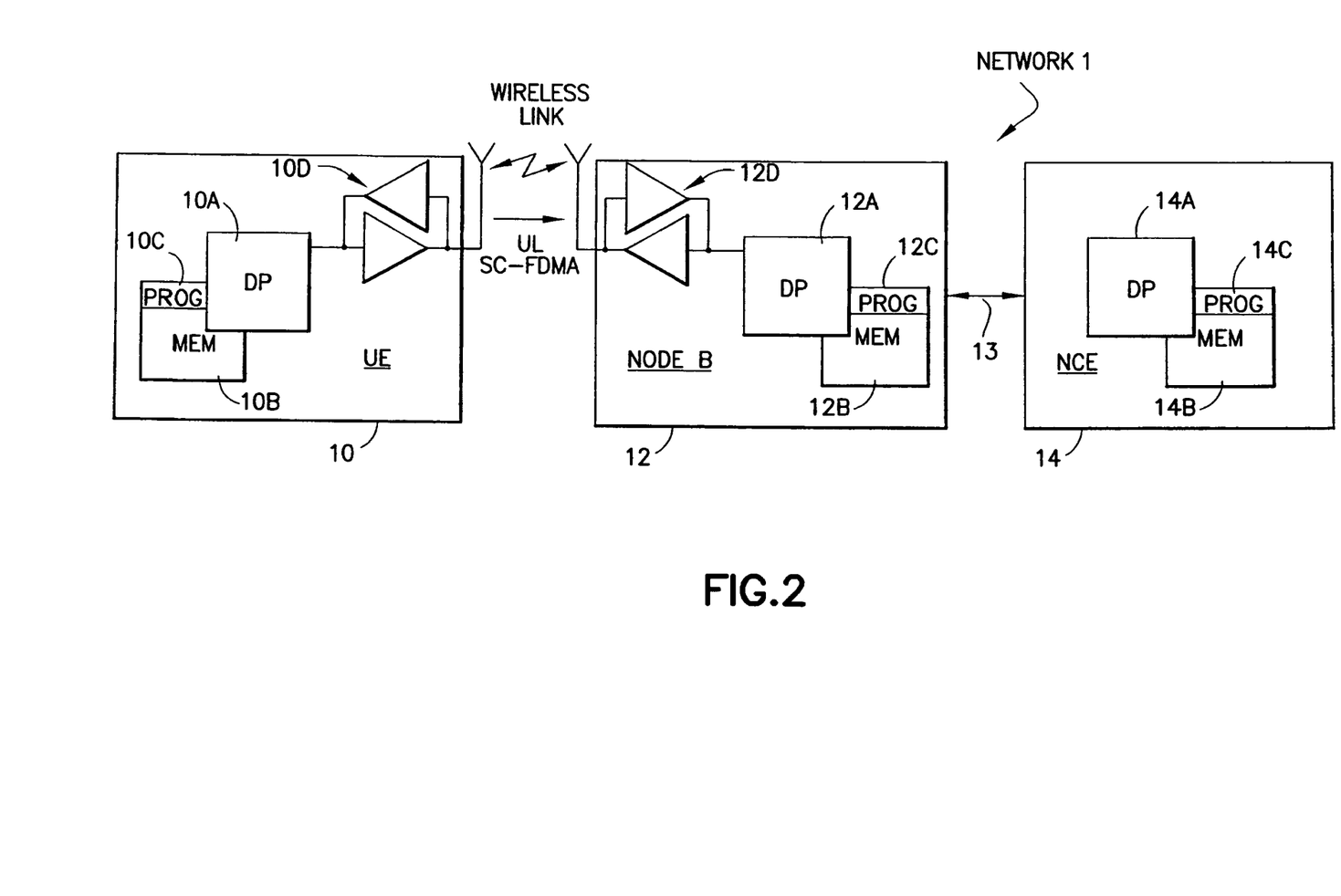
FIG. 2 shows a simplified block diagram of various electronic devices that are suitable for use in practicing the exemplary embodiments of this invention.

Reference is made to FIG. 2 for illustrating a simplified block diagram of various electronic devices that are suitable for use in practicing the exemplary embodiments of this invention. In FIG. 2 a wireless network 1 is adapted for communication with a UE 10 via at least one Node B (base station) 12 (also referred to herein as an eNode B 12). The network 1 may include a network control element 14 coupled to the eNode B 12 via a data link 13. The UE 10 includes a data processor (DP) 10A, a memory (MEM) 10B that stores a program (PROG) 10C, and a suitable radio frequency (RF) transceiver 10D for bidirectional wireless communications with the eNode B 12, which also includes a DP 12A, a MEM 12B that stores a PROG 12C, and a suitable RF transceiver 12D. The eNode B 12 is typically coupled via the data path 13 to the network control element 14 that also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 10A of the UE 10 and the other DPs, or by hardware, or by a combination of software and hardware.

The MEMs 10B, 12B and 14B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Figure 3:
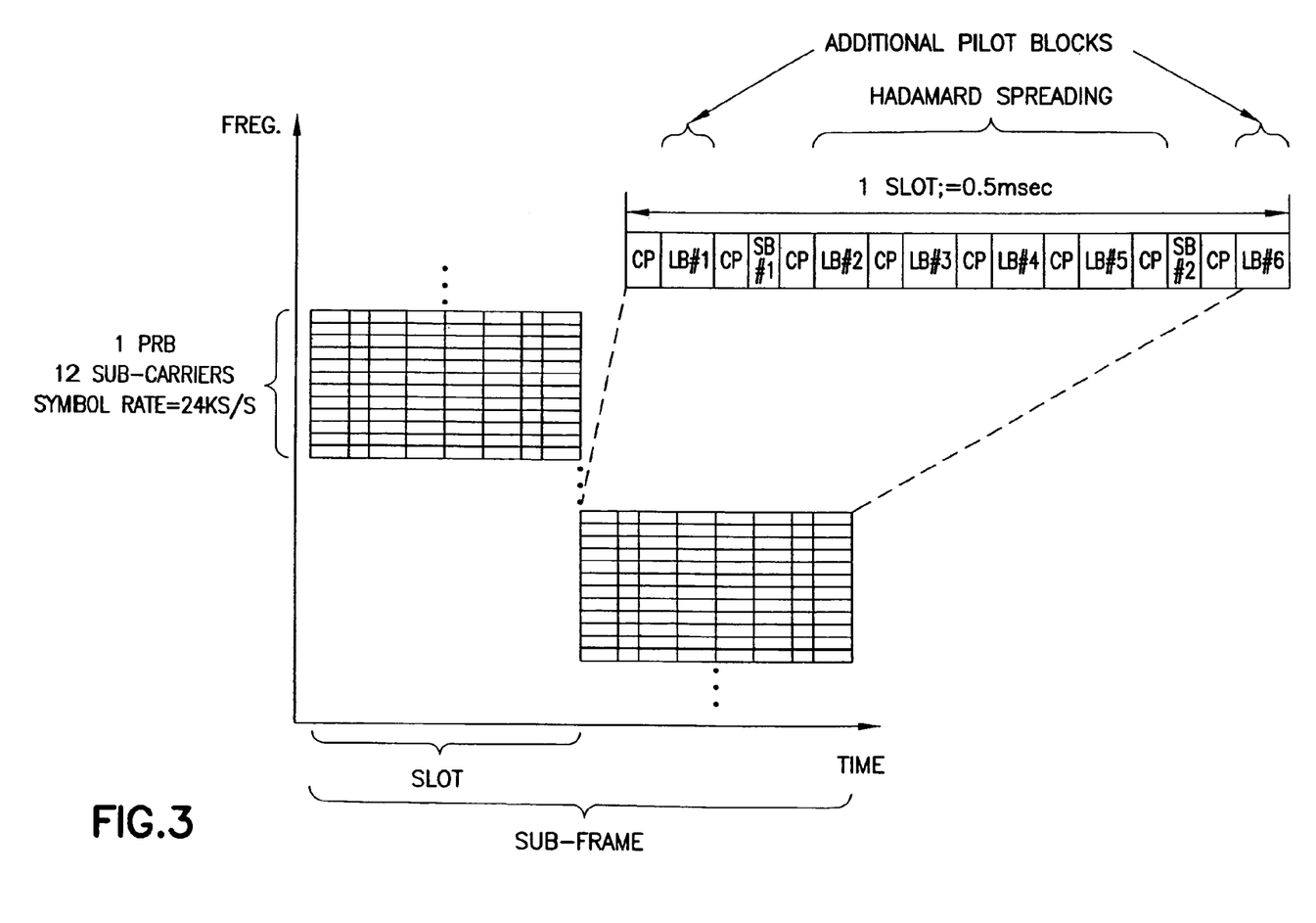
FIG. 3 shows an example of an UL multiplexing scheme in accordance with the exemplary embodiments of this invention.

FIG. 3 shows an example of an UL multiplexing scheme in accordance with the exemplary embodiments of this invention, where as a non-limiting example a subframe (formerly TTI) has a duration of 1.0 ms. In this non-limiting example some type of spreading scheme is employed, such as but not limited to Hadamard spreading, and is applied for the four middle LBs of the LTE UL slot (formerly sub-frame). The spreading factor is equal to four in this non-limiting example.

It should be noted, however, that this particular arrangement is just one non-limiting example, and that in other exemplary embodiments the spreading can be applied for more or less than four LBs, such as for two consecutive LBs. (SF=2), or three LBs. (SF=3) or even 6 LBs. (SF=6). It should be further noted that the Hadamard-type of spreading is possible only with SFs 2, 4, 8, . . . (power of two), and that different spreading code formats, for example GCL (generalized, chirp-like), can be used for different SF lengths which are not a power of two (e.g., 3 and 6). Usage of DFT (Discrete Fourier Transform) sequences as a block spreading codes is also possible.

FIG. 3 assumes that a single PRB is used for transmitting data associated control information without UL data transmission. As shown in this example there are 12 sub-carriers in a single PRB. Thus, this exemplary embodiment, using an allocation of a single PRB, provides four orthogonal resources (corresponding to the four LBs) in a 180 kHz frequency band, each having symbol rate of 24 ks/s (24 thousand symbols per second).

FIG. 3 also assumes that slot (formerly sub-frame) based frequency hopping is applied to provide the frequency diversity needed by the control channels (assuming no re-transmissions, low BLER operation point). It should be noted that if the sub-frame (formerly TTI) length is made equal to 0.5 ms, then the slot (formerly sub-frame) based frequency hopping would preferably not be applied.

As can also be seen in FIG. 3, the LB#1 and LB#6 of the frame structure in accordance with non-limiting and exemplary embodiments of this invention are used for pilot transmission. In that the operation point in terms of Es/No decreases when spreading is used, it is preferred to increase the pilot energy in order to optimize the L1 performance. Note that a current development of LTE uses typically 7 blocks in each slot (normal cyclic prefix). All the blocks are of equal size. In current ACK/NACK setup, 3 blocks are reserved for RS (SF=3) and 4 blocks for ACK/NACK data (SF=4). It is noted than in the agreed ACK/NACK format, number of RS blocks has been increased to optimize the performance of control channel transmission. Formerly, LTE defined TTI equaled 1.0 ms, and TTI spanned 2 subblocks, e.g. 0.5 ms. It is further noted that placement of RS blocks and ACK/NACK data blocks can differ from what has been presented in FIG. 3. In the current slot format, the 3 RS blocks are in the middle of the slot, whereas 2+2 ACK/NACK symbols are in both edges of the slot.

It should be noted, however, that the exemplary embodiments of this invention are not limited to a case where there are additional LBs allocated for pilot signals. That is, in another exemplary embodiment none of the LBs may be allocated for the pilot, or only one may allocated for the pilot.

Both FDM and CDM can be used to multiplex orthogonal pilot channels. In both cases the maximum number of orthogonal pilot channels is approximately the same. The number of orthogonal pilot channels depends to a large degree on the delay spread of the radio channel.

The use of CDM is particularly attractive, as in this approach 12 cyclic shifts can be used with LBs, whereas only six orthogonal cyclic shifts can be used with SBs. A Hadamard type of spreading (SF=2) can be applied with SBs to obtain the 12 orthogonal pilot channels. CDM is achieved by means of cyclic shifts of reference signal sequence.

In lieu of the CMD approach, distributed FDM may also be used to multiplex the pilot channels. However, one potential problem with the use of distributed FDM is that the number of active sub-carriers can become small when the number of multiplexed pilot signals is high.

Further, it should be realized that a combination of CDM and FDM may be used to multiplex the orthogonal pilot channels.

It can be seen as well in FIG. 3 that there are four simultaneous resources of equal size reserved for data-non-associated control signaling. The resource size is designed in such a way that it is capable of conveying 1-32 bits, a range suitable for all possible combinations of data-non-associated control signaling as currently defined, i.e., ACK/NACK, or CQI, or ACK/NACK+CQI. However, and as was noted above, L1 feedback (FB), needed by various MIMO and closed loop beamforming techniques, may also be considered.

Figure 4:
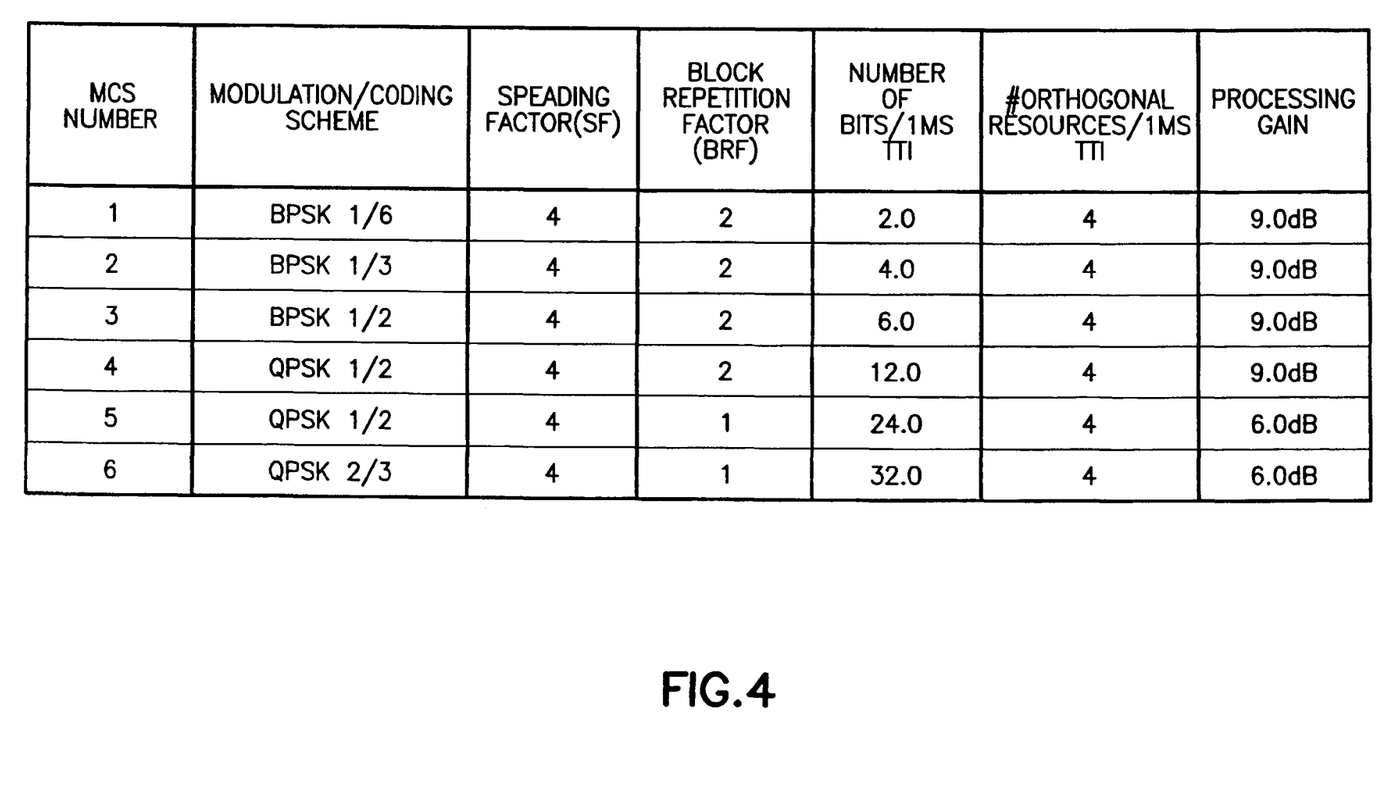
FIG. 4 illustrates a non-limiting example of a MCS set that can be employed with UL multiplexing scheme shown in FIG. 3.

A non-limiting example of a MCS set is shown in FIG. 4. A maximum allowed MCS may be based on propagation conditions, e.g., an average SINR, whereas an actual MCS that is applied may be based on the number of bits that are to be conveyed through the in data-non-associated control channel.

Described now is one exemplary mode of operation. At least one of the four orthogonal resources is reserved for transmission of a small number of information bits (1, 2, 3), such as for ACK/NACK. Using cyclic shifts of, for example, a CAZAC sequence is possible to orthogonally multiplex several modulated sequences into a single orthogonal resource provided by Hadamard spreading. It is noted that also code sequences other than the CAZAC sequence can be applied within each block, e.g., ZAC (zero autocorrelation) sequences based on computer search. Complete orthogonality between the sequences under perfect synchronization is achieved if the length of the cyclic shift is larger than the delay spread of the radio channel. As a non-limiting example, the number of orthogonal cyclic shifts, assuming a 5 microsecond delay spread, is 13 within one LB. The properties of ZAC sequences are similar to CAZAC, with respect to Zero Auto-Correlation (or "nearly zero autocorrelation"). However ZAC sequences have no Constant Amplitude (this is a property of CAZAC).

There are proposed certain computer search-based ZAC-sequences to be used for demodulation reference signals in LTE UL and for sequence modulation applied on PUCCH (i.e, application of this invention). Currently, there are proposals to include this sequence set in the LTE standard. These sequences are disclosed in 2007E02646 FI Low PAR zero autocorrelation zone sequences for multi-code sequence modulation. In 2007E02646 FI the term RAZAC (Random ZAC) is used. However, currently this term is not fully established.

Assuming the use of the one of four orthogonal resources for transmission of the small number of information bits, the remaining orthogonal resources (e.g., three out of four in this case) is targeted to convey a larger amount of control data, e.g., CQI or FBI.

It should be noted that multiple PRBs may be allocated for data-non-associated control signaling. The discussion has thus far assumed (not as a limitation on the practice of this invention) that the data-non-associated signaling requires (at least) a two PRB/5 MHz bandwidth allocation. This corresponds to a signaling overhead of 8%.

In practice, the number of orthogonal pilot channels may be assumed to set a limit for the maximum number of UEs 10 supported by one PRB. One exemplary scenario is:
two PRB/5 MHz are allocated for data-non-associated control signaling;
one out of eight orthogonal resources is reserved for ACK/NACK signaling of nine UEs 10 (separated by orthogonal sequences), that is, nine ACK/NACKs resources/5 MHz; and the remaining seven resources are reserved for CQI/5 MHz.

Figure 5:
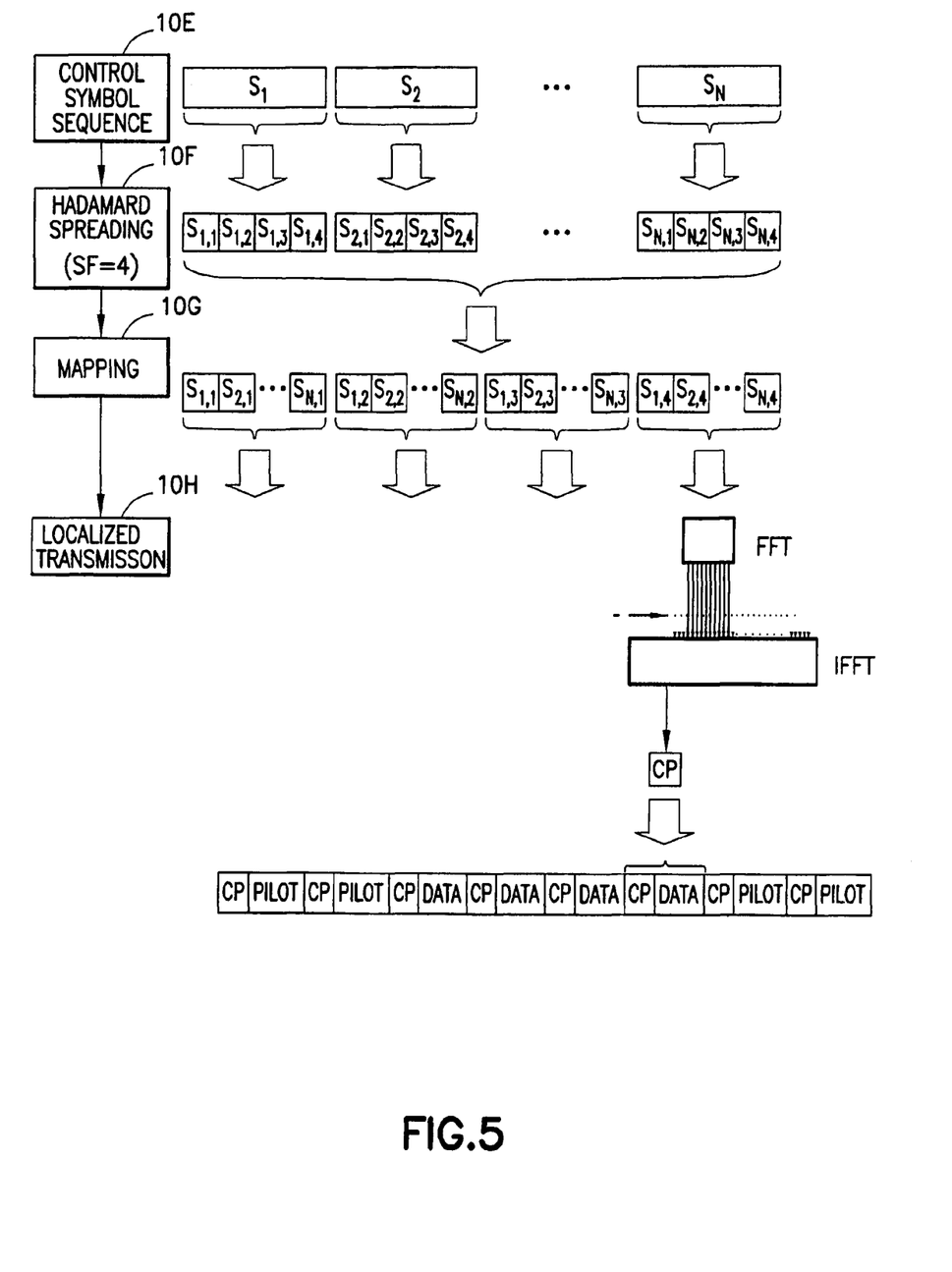
FIG. 5 shows a non-limiting example of control signal multiplexing in accordance with the exemplary embodiments of this invention.

FIG. 5 shows a non-limiting example of the control signal multiplexing in accordance with the exemplary embodiments of this invention. In this case individual control symbol sequences $S_1, S_2, \ldots, S_N$ are spread, such as by using Hadamard spreading (SF=4) to corresponding spread control symbol sequences $s_{1,1}, s_{1,2}, s_{1,3}, s_{1,4}, s_{2,1}, s_{2,2}, s_{2,3}, s_{2,4}, \ldots, s_{N,1}, s_{N,2}, s_{N,3}, \ldots, s_{N,4}$. The corresponding spread control symbol sequences are then mapped as $s_{1,1}, s_{2,1}, s_{3,1}, s_{N,4}, s_{1,2}, s_{2,2}, s_{3,2}, s_{N,2}, \ldots, s_{1,4}, s_{2,4}, s_{3,4}, \ldots, s_{N,4}$ to resource elements assigned for transmission of PUCCH. The spread and mapped control symbol sequences are then applied locally (in the UE 10) to an FFT block, followed by an IFFT block, a CP is added, and the resulting data is inserted into the sub-frame structure as shown in FIG. 3 for transmission in conjunction with data-non-associated control signaling information generated by other UEs 10, as was discussed above. As such, it can be appreciated that the UE 10 of FIG. 2 is further constructed and operated to include a unit 10E for generating/providing the data-non-associated control signaling symbol sequence, a spreading unit 10F, a mapping unit 10G, and a transmission unit 10H that may be considered to include the FFT, IFFT and CP elements.

As should be appreciated, the Node-B 12 is constructed and operated so as to receive, demodulate, despread, demultiplex and process the UL transmissions from a plurality of UEs 10 so as to extract the data-non-associated control signaling from each of the UEs 10.

It should be noted that if one assumes a case where each UE 10 uses a different Hadamard spreading sequence, this information can be provided to the UEs by the Node-B 12 using some DL control signaling. One assumption is that the pilot resources and data resources (both frequency and code allocation) are combined together. This resource may be implicitly signaled using, for example, a DL allocation table (AT).

Based on the foregoing description it should be appreciated that the exemplary embodiments of this invention provide an UL waveform that is well suited for conveying data-non-associated control signaling from the UE 10. In the exemplary embodiments the pilot power is preferably increased to minimize channel estimation losses, as compared to those prior proposals that assume the use of the original sub-frame structure. In a non-limiting example the pilot power increase may be about three times that of the original sub-frame pilot power.

Relatedly, the use of slot (formerly sub-frame) based frequency hopping provides frequency diversity for the control channels.

Relatedly, the use of the exemplary embodiments enables the system to maintain the orthogonality of the reference signals.

Relatedly, the use of the exemplary embodiments enables a sufficient number of orthogonal resources to be provided for servicing a population of UEs 10, provisioning a smaller transmit bandwidth than one PRB (180 kHz) is not required, and the signaling requirements are reduced by providing an equal resource size for each UE 10.

Based on the foregoing it should be apparent that the exemplary embodiments of this invention provide, in a non-limiting aspect thereof, a method, apparatus and computer program product(s) to provide an enhanced data-non-associated control signaling procedure for use on the single carrier, frequency division multiple access uplink in an evolved UTRAN wireless communication system.

Figure 6:
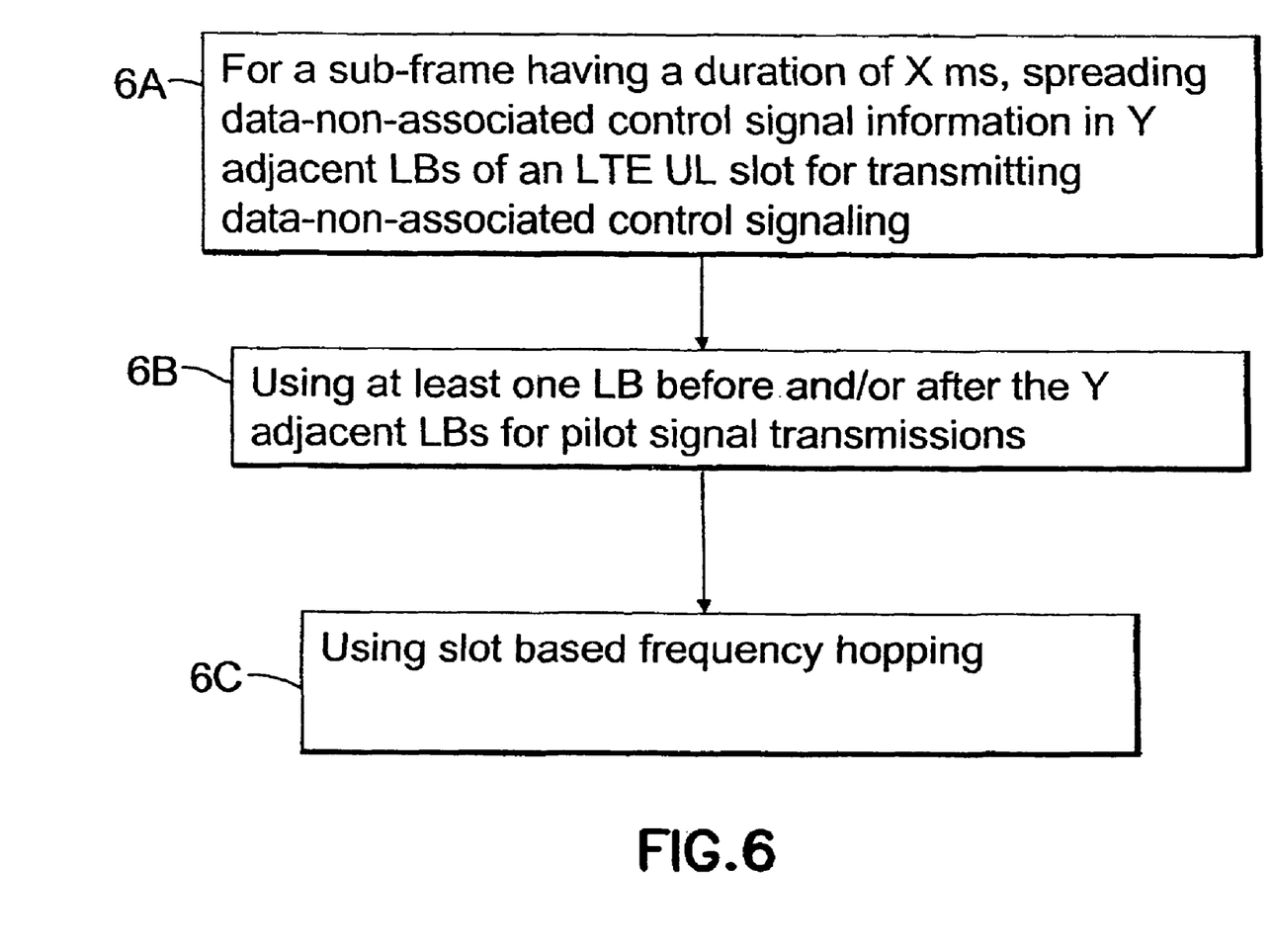
FIG. 6 is a logic flow diagram that is illustrative of a method, and the operation of a computer program product, for the UE shown in FIG. 2.

FIG. 6 is a logic flow diagram that is illustrative of a method, and the operation of a computer program product, for the UE 10 shown in FIG. 2. The method comprises: for a sub-frame (formerly TTI) has a duration of X ms, spreading data-non-associated control signal information in Y adjacent LBs of an LTE UL slot (formerly sub-frame) for transmitting data-non-associated control signaling (Block 6A). It is further within the scope of the method and computer program product to use at least one LB before and/or after the Y adjacent LBs for pilot signal transmissions (Block 6B), as well as to use slot (formerly sub-frame) based frequency hopping (Block 6C). In the method X may equal one, and Y may equal four. In the method the spreading may be accomplished using Hadamard spreading with a spreading factor that is a power of two, or some other type of spreading may be employed.

Also disclosed is a UE that comprises circuitry to spread data-non-associated control signal information in Y adjacent LBs of an LTE UL slot (formerly sub-frame) for transmitting data-non-associated control signaling, and circuitry to employ slot (formerly sub-frame) based frequency hopping.

The various blocks shown in FIG. 6 may be viewed as method steps, and/or as operations that result from operation of computer program code, and/or as a plurality of coupled logic circuit elements constructed to carry out the associated function(s).

Figure 7:
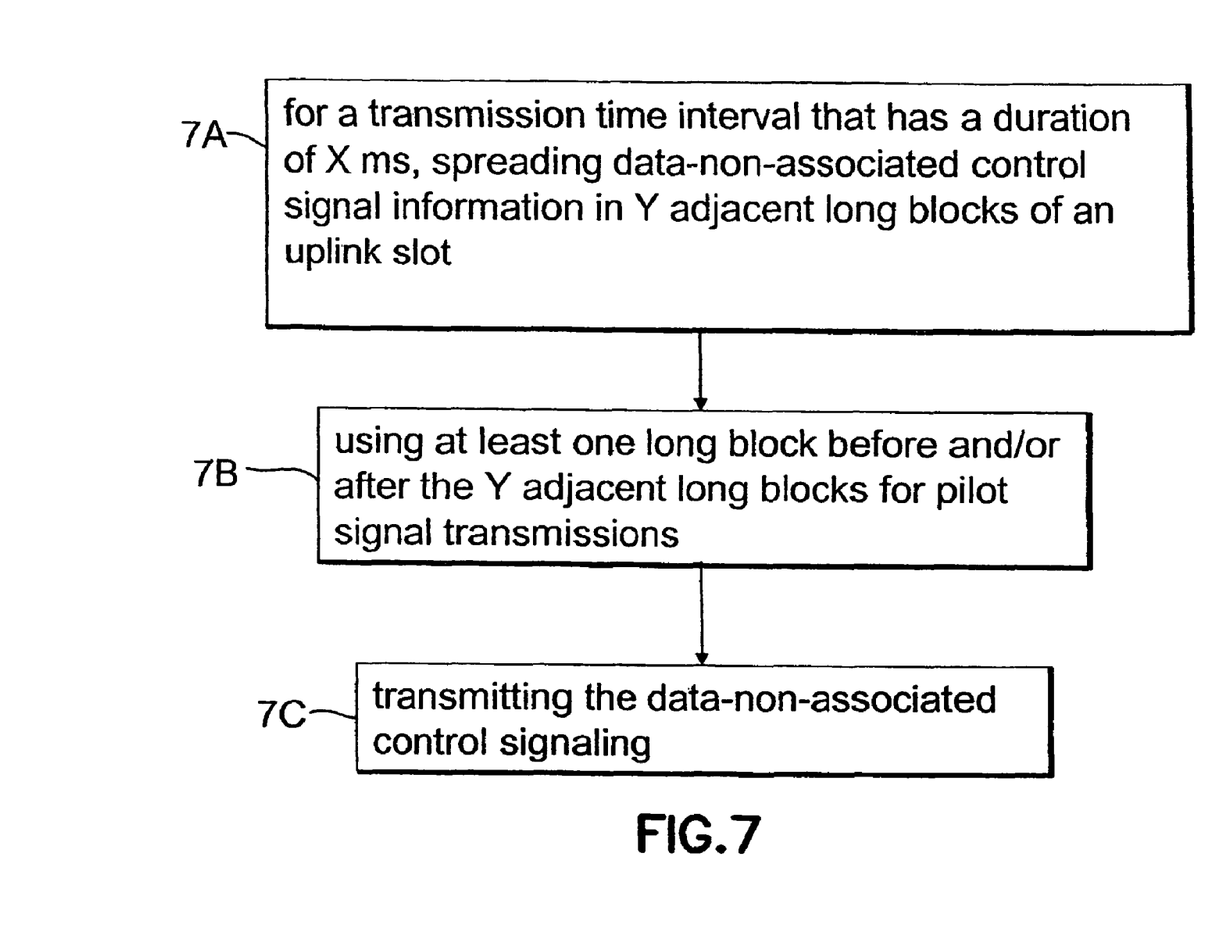
FIG. 7 is a logic flow diagram that is illustrative of a method in accordance with the exemplary embodiments of this invention.

FIG. 7 is a logic flow diagram that is illustrative of a method in accordance with the exemplary embodiments of this invention. As illustrated in FIG. 7 the method comprises for a transmission time interval that has a duration of X ms, spreading data-non-associated control signal information in Y adjacent long blocks of an uplink slot (formerly sub-frame) (Block 7A). It is further illustrated that in the scope of the method there is using at least one long block before and/or after the Y adjacent long blocks for pilot signal transmissions (Block 7B), and transmitting the data-non-associated control signaling (Block 7C).

Figure 8:
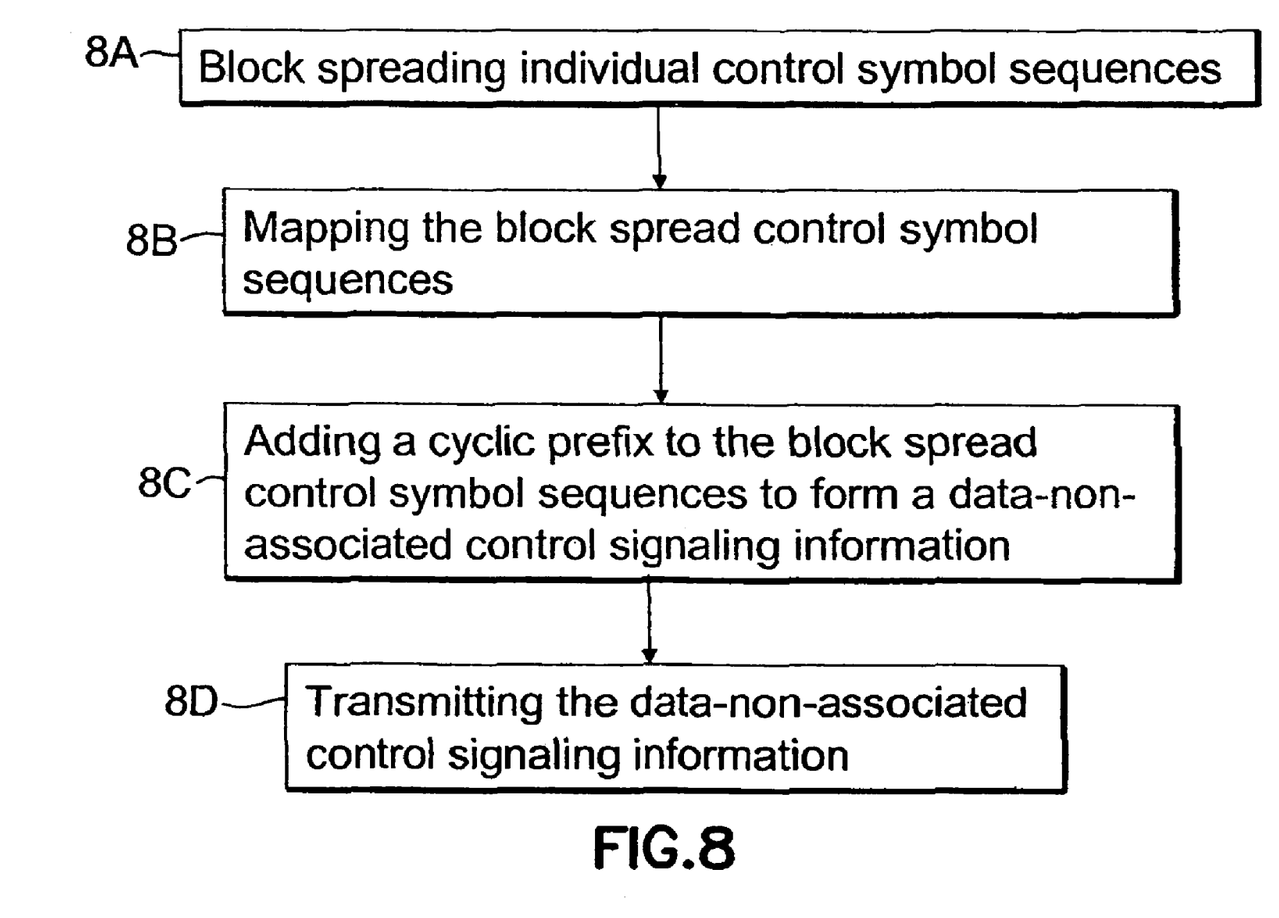
FIG. 8, is a logic flow diagram that is illustrative of a method in accordance with the exemplary embodiments of the invention.

FIG. 8 is a logic flow diagram that is illustrative of a method in accordance with the exemplary embodiments of this invention. As illustrated in FIG. 8 the method comprises block spreading individual control symbol sequences (Block 8A), mapping the block spread control symbol sequences (Block 8B), adding a cyclic prefix to the block spread control symbol sequences to form a data-non-associated control signaling information (Block 8C), and transmitting the data-non-associated control signaling information (Block 8D).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    block spreading individual control symbol sequences, by a wireless communication device, where the block spreading comprises Hadamard spreading;
    mapping the block spread control symbol sequences, wherein mapping comprises mapping the block spread control symbol sequences to resource elements assigned for transmission of a physical uplink control channel;
    adding a cyclic prefix to the block spread control symbol sequences to form a data-non-associated control signaling information; and
    transmitting, by the wireless communication device, the data-non-associated control signaling information.

2. The method of claim 1, where the wireless communication device is disposed within a user equipment.

3. The method of claim 1, where transmitting of the data-non-associated control signaling information is arranged using pre-determined sequences and their cyclic shifts.

4. The method of claim 3, where different data-non-associated control signaling information is separated by the cyclic shift of at least one of a pre-determined sequence and block spreading code.

5. The method of claim 1, comprising using slot based frequency hopping.

6. The method of claim 1, where the symbol sequences comprise at least one of acknowledgment information, negative acknowledgment information, channel quality indicator information, and scheduling request information.

7. The method of claim 1, where block spreading comprises using separate spreading operations for acknowledgment/negative acknowledgment and reference sequences.

8. The method of claim 1, where the sequence is a constant amplitude zero auto correlation sequence or a zero autocorrelation sequence.

9. The method of claim 1, comprising applying the spread and mapped control symbol sequences to a fast Fourier transform block followed by an inverse fast Fourier transform block.

10. An apparatus, comprising:
    at least one processor; and
    at least one memory including computer program code, where the at least one memory and the computer program code are configured, with the at least one processor, to cause the apparatus to at least:
        block spread individual control symbol sequences, where the block spreading comprises Hadamard spreading;
        map the block spread control symbol sequences, wherein mapping comprises mapping the block spread control symbol sequences to resource elements assigned for transmission of a physical uplink control channel;
        add a cyclic prefix to the block spread control symbol sequences to form data-non-associated control signaling information, and; and
    transmit the data-non-associated control signaling information.

11. The apparatus of claim 10, where transmitting of the data-non-associated control signaling information is arranged using pre-determined sequences and their cyclic shifts.

12. The apparatus of claim 11, where different data-non-associated control signaling information is separated by the cyclic shift at least one of a pre-determined sequence and block spreading code.

13. The apparatus of claim 10, where the at least one memory including computer program code is configured, with the at least one processor, to cause the apparatus to use slot based frequency hopping.

14. The apparatus of claim 10, where the symbol sequences comprise at least one of acknowledgment information, negative acknowledgment information, channel quality indicator information, and scheduling request information.

15. The apparatus of claim 10, where the data-non-associated control signaling represents at least one of acknowledgment information, negative acknowledgment information, channel quality indicator information, and scheduling request information.

16. The apparatus of claim 10, where block spreading comprises using separate spreading operations for acknowledgment/negative acknowledgment and reference sequences.

17. The apparatus of claim 10, where the sequence is a constant amplitude zero auto correlation sequence or a zero autocorrelation sequence.

18. The apparatus of claim 10, comprising applying the spread and mapped control symbol sequences to a fast Fourier transform block followed by an inverse fast Fourier transform block.

19. A non-transitory computer readable medium encoded with a computer program executable by a processor to perform actions comprising:
   block spreading individual control symbol sequences, where the block spreading comprises Hadamard spreading;
   mapping the block spread control symbol sequences, wherein mapping comprises mapping the block spread control symbol sequences to resource elements assigned for transmission of a physical uplink control channel;
   adding a cyclic prefix to the block spread control symbol sequences to form data-non-associated control signaling information; and
   transmitting the data-non-associated control signaling information.

20. An integrated circuit, comprising:
   a first circuit configurable to block spread individual control symbol sequences, where the block spreading comprises Hadamard spreading;
   a second circuit configurable to map the block spread control symbol sequences, wherein mapping comprises mapping the block spread control symbol sequences to resource elements assigned for transmission of a physical uplink control channel;
   a third circuit configurable to add a cyclic prefix to the block spread control symbol sequences to form data-non-associated control signaling information; and
   a fourth circuit configurable to transmit the data-non-associated control signaling information.

21. An apparatus, comprising:
   means for block spreading individual control symbol sequences, where the block spreading comprises Hadamard spreading;
   means for mapping the block spread control symbol sequences, wherein mapping comprises mapping the block spread control symbol sequences to resource elements assigned for transmission of a physical uplink control channel;
   means for adding a cyclic prefix to the block spread control symbol sequences to form data-non-associated control signaling information; and
   means for transmitting the data-non-associated control signaling information.

22. The apparatus of claim 21 where the means for block spreading comprises a spreading unit, the means for mapping comprises a mapping unit, the means for adding comprises a processor coupled to a memory, and the means for transmitting comprises a transmitter.

* * * * *